US011146157B2

(12) United States Patent
Steinberger et al.

(10) Patent No.: US 11,146,157 B2
(45) Date of Patent: Oct. 12, 2021

(54) DUAL ROTOR ELECTRIC MACHINE IN AN AUTOMOTIVE APPLICATION

(71) Applicant: SCHAEFFLER TECHNOLOGIES AG & CO. KG, Herzogenaurach (DE)

(72) Inventors: Markus Steinberger, Macedonia, OH (US); Gregory Heeke, Wooster, OH (US); Md. Wasi Uddin, Akron, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 535 days.

(21) Appl. No.: 15/970,177

(22) Filed: May 3, 2018

(65) Prior Publication Data
US 2019/0341833 A1 Nov. 7, 2019

(51) Int. Cl.
*H02K 16/02* (2006.01)
*H02K 1/22* (2006.01)
*H02K 9/19* (2006.01)
*H02K 7/00* (2006.01)

(52) U.S. Cl.
CPC .............. *H02K 16/02* (2013.01); *H02K 1/22* (2013.01); *H02K 7/006* (2013.01); *H02K 9/19* (2013.01)

(58) Field of Classification Search
CPC .......... H02K 16/02; H02K 1/22; H02K 7/006; H02K 9/19; H02K 7/14; F04C 14/08
USPC ........................................................ 310/112
See application file for complete search history.

(56) References Cited

U.S. PATENT DOCUMENTS

| 4,995,791 | A | * | 2/1991 | Loprete | F04B 39/123 |
| | | | | | 417/366 |
| 5,804,935 | A | * | 9/1998 | Radev | B60L 50/60 |
| | | | | | 318/139 |
| 7,466,053 | B1 | | 12/2008 | Radev | |
| 9,440,532 | B1 | * | 9/2016 | Jongebloed | F16D 27/06 |
| 9,441,726 | B1 | * | 9/2016 | Palazzolo | F16H 57/0436 |
| 2001/0002629 | A1 | | 6/2001 | Arai et al. | |
| 2005/0032602 | A1 | * | 2/2005 | Wagle | F04C 2/102 |
| | | | | | 475/230 |
| 2008/0075608 | A1 | | 3/2008 | Suzuki et al. | |
| 2008/0136294 | A1 | * | 6/2008 | Powers | H02K 21/029 |
| | | | | | 310/67 R |
| 2010/0284824 | A1 | * | 11/2010 | Hippen | F02B 39/10 |
| | | | | | 417/44.1 |

(Continued)

FOREIGN PATENT DOCUMENTS

| DE | 102014217298 A1 | 3/2016 | |
| JP | 2005030517 A | 2/2005 | |
| WO | WO-2015148662 A1 * | 10/2015 | ............... F04C 2/18 |

OTHER PUBLICATIONS

International Search Report and Written Opinion for PCT Application No. PCT/US2019/026931, dated Jul. 29, 2019, 9 pages.

*Primary Examiner* — Alex W Mok
(74) *Attorney, Agent, or Firm* — Dickinson Wright PLLC

(57) ABSTRACT

An electrical machine for use in a vehicle, comprising a stator configured to output a rotating magnetic field, a primary rotor located radially between an output shaft and the stator, a secondary rotor, wherein the secondary rotor is located radially between the stator and the output shaft, and a hydraulic pump attached to the secondary rotor, wherein the hydraulic pump is configured to output lubricant to an outlet in response to the rotating magnetic field generated therebetween by the stator and the secondary rotor.

18 Claims, 1 Drawing Sheet

(56) References Cited

U.S. PATENT DOCUMENTS

| | | | |
|---|---|---|---|
| 2010/0320849 A1* | 12/2010 | Wilton | H02K 7/116 310/52 |
| 2012/0201657 A1* | 8/2012 | Donnelly | F02C 6/20 415/123 |
| 2013/0192949 A1 | 8/2013 | Frait et al. | |
| 2013/0257196 A1* | 10/2013 | Yamamoto | H02K 9/19 310/54 |
| 2013/0274052 A1* | 10/2013 | Kalmbach | B60K 1/00 475/150 |
| 2015/0069865 A1* | 3/2015 | Alfermann | H02K 9/19 310/54 |
| 2016/0024997 A1* | 1/2016 | Buschur | F02B 37/10 60/607 |
| 2016/0101679 A1* | 4/2016 | Kim | F16H 57/0421 475/5 |
| 2016/0164377 A1* | 6/2016 | Gauthier | H02K 9/19 310/54 |
| 2016/0164378 A1* | 6/2016 | Gauthier | H02K 5/20 310/54 |
| 2016/0290484 A1* | 10/2016 | Lenczewski | B60K 23/08 |
| 2017/0054334 A1* | 2/2017 | Binder | F04D 25/06 |
| 2017/0097019 A1* | 4/2017 | Afshari | F15B 15/08 |
| 2017/0254408 A1 | 9/2017 | Takemori et al. | |
| 2017/0282725 A1 | 10/2017 | Kelleter et al. | |

\* cited by examiner

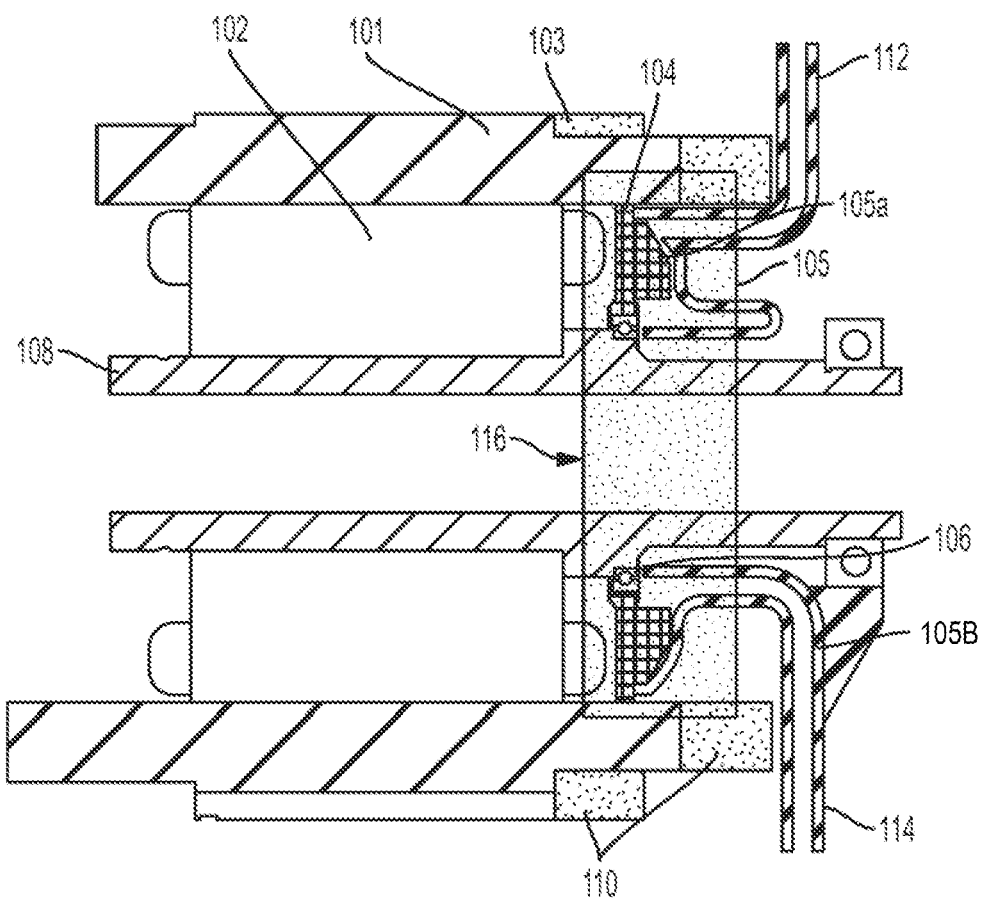

DUAL ROTOR ELECTRIC MACHINE IN AN AUTOMOTIVE APPLICATION

TECHNICAL FIELD

The present disclosure relates to electrical traction motors, including those motors that may include dual rotors.

BACKGROUND

A hybrid transmission, also known as an e-axle, may utilize a motor to drive components of the e-axle, such as the motor and gear train. Lube and cooling of an e-axle application may be needed. The e-axle may utilize a separate, electrically driven hydraulic pump to lubricate and cool both the motor and the gear train. Such an arrangement with a separate hydraulic pump from the motor, however, may require additional costs.

SUMMARY

According to one embodiment, an electrical machine for use in a vehicle, comprising a stator configured to output a rotating magnetic field, a primary rotor located radially between an output shaft and the stator, a secondary rotor, wherein the secondary rotor is located radially between the stator and the output shaft, and a hydraulic pump attached to the secondary rotor, wherein the hydraulic pump is configured to output lubricant to an outlet in response to the rotating magnetic field generated therebetween by the stator and the secondary rotor.

According to a second embodiment, a dual rotor electrical machine, comprising a stator, a primary rotor located radially between the stator and an output shaft, a secondary rotor located radially between the stator and the output shaft, and an outlet configured to output lubricant in response to a rotating magnetic field generated therebetween the stator and the secondary rotor.

According to a third embodiment, an electrical machine for use in a vehicle, comprising a hydraulic pump attached to a secondary rotor, wherein the secondary rotor is located radially between a stator and output shaft and further axially arranged alongside a primary rotor attached to the output shaft, wherein the hydraulic pump is configured to output lubricant to an outlet in response to a rotating magnetic field generated therebetween the by the stator of the electrical machine and the secondary rotor.

BRIEF DESCRIPTION OF THE DRAWINGS

FIG. 1 is a schematic of a cross-section of a dual rotor electrical motor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A hybrid transmission, also known as an e-axle, may use a separate electrically driven hydraulic pump to lubricate and cool both the motor and the gear train. Lube and cooling of an e-axle application may be needed. There may be additional costs associated with a vehicle application to utilize a separate pump. There may be a solution that exists to add an additional rotor next to a traction motor within the magnetic field generated by the traction motor stator. This rotor can be used to drive a hydraulic pump to generate oil flow to cool the rotor and lube the gear train. The secondary rotor may use the rotating magnetic field created by the primary traction motor and spins at an independent speed from the traction motor. In such an arrangement, such as a stall condition, the primary traction motor may not spin but may generate a lot of heat in the stator and rotor. The secondary rotor may spin in a synchronous speed with the rotating magnetic field and may supply cooling oil and lube to the motor and gear train as needed. Such an arrangement may be advantageous as no separate motor and controls are needed. When the traction motor is energized the secondary rotor may spin.

FIG. 1 disclose a schematic cross-section of a dual rotor electrical machine or e-motor. Induction motors may include a stator and a rotor. The exemplary embodiment may utilize an electrical motor with a wound stator 101 and a primary rotor 102 constructed of either a permanent magnet, switched or synchronous reluctance, induction type (as shown), or others. The motor may be generally used as a traction motor in a hybrid vehicle or electric vehicle. The motor may also be a motor from an electric axle (e.g. E-axle). The secondary rotor 104 may be used to pump coolant to the motor and/or electrical system, as explained further below. The stator may provide a rotating magnetic field that drives various components (e.g. rotor, output shaft, rotor shaft, etc.) or could guide the flow of fluid to or from a rotating part. The output shafts 108 or rotor shafts 108 may be associated with the wheels on the axle of the vehicle. The output shafts may be connected to a drive shaft.

The stator and corresponding stator windings may be extended by a section 103 to allow the stator magnetic field to work in conjunction with a secondary rotor 104. The secondary motor 104 may not be utilized to provided traction to the engine. In a typical application, the stator magnetic field may not be aligned with the secondary rotor 104, thus the extensions to the rotor at 103 and 110 may allow the stator magnetic field to house the secondary rotor. The secondary rotor 104 may be a permanent magnet or switched-reluctance type. The stator magnetic field 116 may be located at the inner diameter (ID) of a stator. The extensions 110 and 103 of the stator 101 may allow the magnetic field to rotate the secondary rotor 104. As illustrated in FIG. 1, the stator 101 may have a first portion that aligns with the primary rotor 102, as well as a second portion that extends out axially further from the primary rotor 102. The first, radially outward portion may be more aligned with an end of the primary rotor may, but the first radially outward portion may be extended by section 103 of the stator. The second portion that extends out axially further from the primary rotor 102 may also be extended out by section 110.

The secondary rotor 104 may be supported by a bearing 106 that allows the secondary rotor 104 to rotate independently from the primary traction rotor 102 and output shaft 108. The secondary rotor 104 may be attached to a hydraulic pump 105. As shown in FIG. 1, an impeller-type secondary rotor 104 may include blades 105a integrated directly on the secondary rotor 104. A pump housing 105b may be integrated directly on the secondary rotor 104. A pump housing 105b may direct oil flow into the pump section and out to a pressurized lube circuit. There may be an inlet 114 that is utilized to suction oil from a sump to the hydraulic pump 105. Additionally, there may be an outlet that is utilized to transfer a lubricant from the hydraulic pump 105 to the motor to lubricate and cool the motor. The hydraulic pump may include blades or ports used to redirect the flow of fluid.

As shown in FIG. 1, a stator coil/field extension 110 may be required to house the secondary rotor 104 within the magnetic fields of the stator 101. The extensions may be integrated with the stator 101 or may be a separate component. The extension may allow for a magnetic field to be generated such that the stator field overlaps with the secondary rotor 104. Because the magnetic field overlaps with the secondary rotor 104, the secondary rotor 104 may be utilized to drive a hydraulic pump 105 or other component to lube or cool the hybrid transmission or other components of the hybrid transmission. Absent the extensions or extended stator, the magnetic fields that are created may not be able to reach the secondary rotor 104 that may be utilized for pumping coolant to the motor and/or electrical system.

When a traction motor is energized based on the vehicle's control strategy, the secondary rotor 104 may spin within the rotating magnetic field of the main traction motor. For example, If the vehicle is on a steep hill and moving very slowly the traction motor would not generate enough speed to properly lubricate the gear train. The secondary rotor can spin with the rotating magnetic field of the traction motor stator independent of the traction motor. This can allow the secondary rotor to spin faster and provide sufficient lubrication. The secondary rotor 104 may spin regardless of whether the main traction motor is rotating or not. The traction motor stator field can rotate even if the motor rotor is stalled. With the rotating field the secondary pump rotor can rotate and provide cooling oil flow for the transmission and electronics.

In one example, an e-motor may begin to operate at a relatively small speed. For example in an induction motor, the primary traction motor may apply 100 revolutions per minute (RPMs), which may cause the secondary rotor 104 may revolve at 1000 RPMs. The primary rotor 102 may lag in rotation/revolutions as compared to the secondary rotor 104. While, the primary rotor 102 may try to achieve a rotation of 1000 RPMs, the rotor 102 may not achieve the full 1000 RPMs and rotate at a reduced revolution at 950 RPMS. The secondary rotor 104 may rotate in coordination or at the same speed with the revolutions of the stator field. Thus, the secondary rotor 104 may not be controlled exclusively and instead, the secondary rotor 104 may be controlled by the primary rotor 102.

The hydraulic pump 105 may either be a hydrostatic or hydrodynamic pump. The hydraulic pump 105 may generate flow with enough power to overcome pressure induce by a load at the pump outlet 112. When a hydraulic pump operates, it may create a vacuum at the pump inlet 114, which forces fluid/liquid from the reservoir (not shown) into the inlet line 114 to the pump 105 and by mechanical action delivers this liquid to the pump outlet 112 and forces it into the hydraulic system (e.g. electric motor). The pump 105 may be either a positive displacement pump or a variable displacement pump that allows the pump's displacement to be adjusted. The pump 105 may also utilize a port (e.g. port plate) to direct liquid flow form the inlet 114 to the outlet 112.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrical machine for use in a vehicle, comprising:
a stator configured to output a rotating magnetic field;
a primary rotor located radially between an output shaft and the stator;
a secondary rotor, wherein the secondary rotor is located radially between the stator and the output shaft, wherein the secondary rotor is configured to spin within the rotating magnetic field when the primary rotor is not rotating; and
a hydraulic pump attached to the secondary rotor, wherein the hydraulic pump is configured to output lubricant to an outlet in response to the rotating magnetic field generated therebetween by the stator and the secondary rotor.

2. The electrical machine of claim 1, wherein the primary rotor is fixed to the output shaft and the secondary rotor is configured to rotate independently of the output shaft.

3. The electrical machine of claim 1, wherein the primary rotor revolves at a first rate of revolution and the secondary rotor revolves at a second rate of revolution.

4. The electrical machine of claim 3, wherein the first rate of revolution is less than the second rate of revolution.

5. The electrical machine of claim 1, wherein the hydraulic pump includes a blade configured to rotate and direct the lubricant to the outlet.

6. The electrical machine of claim 1, wherein the secondary rotor is configured to lag behind revolving of the primary rotor.

7. The electrical machine of claim 1, wherein the secondary rotor is configured to spin in a synchronous speed with the rotating magnetic field.

8. The electrical machine of claim 1, wherein the secondary rotor is supported by a bearing that allows the secondary rotor to rotate independently of the primary rotor.

9. A dual rotor electrical machine, comprising:
 a stator;
 a primary rotor located radially between the stator and an output shaft;
 a secondary rotor located radially between the stator and the output shaft; and
 an outlet configured to output lubricant in response to a rotating magnetic field generated therebetween the stator and the secondary rotor, wherein the secondary rotor is configured to spin within the rotating magnetic field when the primary rotor is not rotating.

10. The dual rotor electrical motor of claim 9, wherein the secondary rotor is supported by a bearing that allows the secondary rotor to rotate independently of the primary rotor.

11. The dual rotor electrical motor of claim 9, wherein a hydraulic pump is attached to the outlet and is configured to direct the lubricant to the outlet.

12. The dual rotor electrical motor of claim 11, wherein the hydraulic pump includes a blade configured to direct lubricant to the outlet in response to the rotating magnetic field.

13. The dual rotor electrical motor of claim 9, wherein the primary rotor is configured to output torque to the output shaft.

14. The dual rotor electrical motor of claim 9, wherein the secondary rotor is axially aligned with the primary rotor.

15. The dual rotor electrical motor of claim 9, wherein the primary rotor revolves at a first rate of revolution and the secondary rotor revolves at a second rate of revolution, wherein the first rate of revolution is less than the second rate of revolution.

16. The dual rotor electrical motor of claim 9, wherein the secondary rotor spins in a synchronous speed with the rotating magnetic field.

17. The dual rotor electrical motor of claim 9, wherein the secondary rotor is configured to lag behind revolving of the primary rotor.

18. An electrical machine for use in a vehicle, comprising:
 a hydraulic pump attached to a secondary rotor, wherein the secondary rotor is located radially between a stator and output shaft and further axially arranged alongside a primary rotor attached to the output shaft, wherein the hydraulic pump is configured to output lubricant to an outlet in response to a rotating magnetic field generated therebetween the by the stator of the electrical machine and the secondary rotor, wherein the secondary rotor is configured to spin within the rotating magnetic field at a first rate of rotation, and the primary rotor is configured to spin at a second rate of rotation, wherein the first rate of rotation and the second rate of rotation are different.

* * * * *